United States Patent
Hidaka et al.

(10) Patent No.: US 7,743,875 B2
(45) Date of Patent: Jun. 29, 2010

(54) POWER STEERING APPARATUS HAVING FAILURE DETECTION DEVICE FOR ROTATION ANGLE SENSORS

(75) Inventors: Kenichirou Hidaka, Chita-gun (JP); Junko Hidaka, legal representative, Chita-gun (JP); Nobuhiko Makino, Anjo (JP); Takahiro Kojo, Gotenba (JP); Theerawat Limpibunterng, Susono (JP)

(73) Assignees: Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 185 days.

(21) Appl. No.: 12/179,638

(22) Filed: Jul. 25, 2008

(65) Prior Publication Data

US 2009/0026004 A1   Jan. 29, 2009

(30) Foreign Application Priority Data

Jul. 25, 2007   (JP) ............................... 2007-193828

(51) Int. Cl.
*B62D 5/04* (2006.01)
(52) U.S. Cl. .................. 180/446; 180/443; 180/402; 180/407; 701/41; 701/42; 701/43
(58) Field of Classification Search ................ 180/446, 180/443, 402, 407; 701/41, 42, 43
See application file for complete search history.

(56) References Cited

U.S. PATENT DOCUMENTS

| | | | | |
|---|---|---|---|---|
| 6,382,345 B2 * | 5/2002 | Kada et al. | ................. | 180/446 |
| 6,705,424 B2 * | 3/2004 | Ogawa et al. | ............... | 180/446 |
| 6,718,242 B1 * | 4/2004 | Mori et al. | ..................... | 701/41 |
| 6,896,091 B2 * | 5/2005 | Kojo et al. | ................... | 180/402 |
| 7,154,404 B2 | 12/2006 | Sato | | |
| 2003/0168275 A1 * | 9/2003 | Sakugawa | ................... | 180/402 |
| 2004/0147002 A1 | 7/2004 | Cohen et al. | | |
| 2004/0199316 A1 | 10/2004 | Kato et al. | | |
| 2006/0247838 A1 | 11/2006 | Bauer | | |
| 2008/0035411 A1 | 2/2008 | Yamashita et al. | | |

FOREIGN PATENT DOCUMENTS

| | | |
|---|---|---|
| DE | 10 2006 001 357 | 1/2006 |
| DE | 10 2006 001 357 | 7/2007 |

(Continued)

OTHER PUBLICATIONS

Extended European Search Report dated Nov. 27, 2009, issued in corresponding European Application No. 08012329.2-2423.

(Continued)

*Primary Examiner*—Lesley Morris
*Assistant Examiner*—Marlon A Arce
(74) *Attorney, Agent, or Firm*—Nixon & Vanderhye PC

(57) ABSTRACT

A power steering apparatus has a steering power assisting system coupled to tire wheels and a variable gear transfer system coupled to a steering wheel. The steering power assisting system includes a torsion bar rotation sensor and a first actuator rotation sensor to calculate a first pinion angle and a second pinion angle based on the detected rotation angles, respectively. The variable gear transfer system includes a steering sensor and a second actuator rotation sensor to calculate a third pinion angle based on the detected rotation angles. Sensor failure is detected by comparing the calculated first, second and third pinion angles.

8 Claims, 1 Drawing Sheet

FOREIGN PATENT DOCUMENTS

| | | |
|---|---|---|
| EP | 1 568 577 | 8/2005 |
| JP | 2005-043071 | 2/2005 |
| JP | 2006-177750 | 7/2006 |
| WO | WO 2005/047085 | 5/2005 |

OTHER PUBLICATIONS

Chinese Office Action dated Oct. 30, 2009, issued in corresponding Chinese Application No. 200810133491.1, with English translation.

* cited by examiner

POWER STEERING APPARATUS HAVING FAILURE DETECTION DEVICE FOR ROTATION ANGLE SENSORS

CROSS REFERENCE TO RELATED APPLICATION

This application is based on and incorporates herein by reference Japanese Patent Application No. 2007-193828 filed on Jul. 25, 2007.

FIELD OF THE INVENTION

The present invention relates to a power steering apparatus having a failure detection device for a plurality of rotation angle sensors.

BACKGROUND OF THE INVENTION

A conventional variable gear transfer system varies an amount of change in steering angle of tire wheels (steered wheels) relative to an amount of operation of a steering wheel in a vehicle. This variable gear transfer system has a steering sensor for detecting a steering angle of the steering wheel and an electric actuator for varying the rotation transfer ratio in accordance with the detected steering angle, so that the change amount in the steering angle of the steered wheels relative to the operation amount of the steering wheel is varied. Since the variable gear transfer system thus performs steering control by using the steering angle detected by the steering sensor, accurate control cannot be performed if the steering sensor fails to operate normally. Therefore, it is necessary to detect any failure of the steering sensor.

The variable gear transfer system also has an actuator sensor for detecting a rotation angle of an output shaft of the electric actuator, thereby to perform feedback control by comparing an actual rotation angle of the actuator output shaft with a target rotation angle of the same. It is therefore also necessary to detect any failure of the actuator sensor.

US 2004/0147002A1 (JP 2002-340625A) discloses a failure detection device for detecting failure of a steering sensor. This failure detection device performs failure detection for a steering sensor by moving a sensor unit for detecting rotation of a steering shaft a predetermined distance, which is longer than a unit pitch of detection of the steering shaft. The failure of the steering sensor is detected by checking whether a signal produced by the sensor unit changes while the sensor unit is moved.

If failure in the above steering sensor is a mechanical one, it can be detected easily because the signal produced from the steering sensor does not change in a self-diagnosis operation. If failure is an electrical one, there are some cases in which the signal produced from the steering sensor does not change. This failure detection device may not detect any failure in some cases.

JP 2006-177750 discloses a failure detection device for detecting failure of an actuator sensor. In this device, a resolver is energized by a sine-wave signal, amplitude-modulated in accordance with a rotation angle of a rotor relative to a stator, and produces a sine-wave phase output signal and a cosine-wave phase output signal. The amplitude changes of these output signals are different from each other by $\pi/2$ in phase. The amplitudes of the sine-wave phase output signal and the cosine-wave phase output signal are calculated to determine the rotation angle in accordance with the calculated amplitudes. If the square-root of a sum of square of each amplitude continues to be outside a predetermined range, failure is tentatively determined. If this failure further continues, the failure of the actuator sensor is determined finally.

In many instances, a steering power assisting system is mounted in a vehicle together with the variable gear transfer system. The steering power assisting system is for assisting steering power. In this system, an input shaft and an output shaft are coupled by way of a torsion bar, and a torsion bar sensor is provided to detect a difference in rotation angles of the input shaft and the output shaft. The assisting power, which is to be generated by an electric actuator, is determined in accordance with the detected rotation angle difference, so that a target rotation angle of the electric actuator is determined in accordance with the determined assisting power. The electric actuator is feedback-controlled so that an actual actuator rotation angle detected by the actuator sensor converges to the determined target rotation angle. It is also necessary to detect failure in the torsion bar sensor and in the actuator sensor.

JP 2005-43071A discloses a failure detection device for detecting failure of a torsion bar sensor This failure detection device is provided for an electric power steering apparatus, which includes twin resolver type torque sensor having a torsion bar, an input shaft rotation angle sensor and an output shaft rotation angle sensor. Failure of the torsion bar sensor is detected, if an inter-phase electrical shorting is detected in either of the rotation angle sensors. This electrical shorting is determined, if the electric angle calculation result by one of the rotation angle sensors is outside a first predetermined range including 45° for more than a predetermined period and the electric angle calculation result by the other of the rotation angle sensor is also outside a second predetermined range including 45° for more than a predetermined period.

U.S. Pat. No. 7,154,404 (JP 2005-219527A) discloses a failure detection device for detecting failure in a rotation angle sensor, which detects rotation angle of an electric actuator in a steering power assisting system. This steering power assisting system includes a three-phase brushless DC motor, a steering torque detector for detecting steering torque generated by a steering wheel, a resolver for detecting a resolver rotation angle of the brushless DC motor, a rotation angle converter for converting the detected resolver rotation angle into a motor rotation angle corresponding to the number of poles of the brushless DC motor, a rotation direction command unit for determining a rotation direction command for the brushless DC motor, a current calculation unit for calculating a command current for driving the brushless DC motor based on the detected steering torque. The failure detection device is connected to the current calculation unit to communicate with the current calculation unit and checks whether the calculation result of the current calculation unit is in a normal range. The failure detection device receives the motor rotation angle and the rotation direction command and checks the current calculation unit based on the received motor rotation angle and rotation direction command, thereby detecting the failure of the rotation angle sensor of the electric actuator.

The above failure detection devices for the actuator sensor and the torsion bar sensor can detect failure only when the failure continues.

SUMMARY OF THE INVENTION

It is therefore an object of the present invention to accurately detect failure in a sensor system in a power steering apparatus, which includes a steering power assisting system and a variable gear transfer system.

According to the present invention, a power steering apparatus is provided for a vehicle having a steering wheel to steer tire wheels. This apparatus comprises a power steering system, a variable gear transfer system and a failure detection device. The power assisting system includes a torsion bar operatively coupled with the steering wheel, a first electric actuator operatively coupled with the output side of the torsion bar to provide steering assisting power to steer the tire wheels, a torsion bar sensor for detecting a rotation angle of an output side of the torsion bar, and a first actuator sensor for detecting a first rotation angle of the first actuator. The variable gear transfer system includes a second electric actuator provided between the steering wheel and the torsion bar for transferring rotation of the steering wheel to the torsion bar at a variable transfer ratio thereby to change an amount of steering angle of the tire wheels relative to an operation amount of the steering wheel, a steering sensor for detecting a steering rotation angle of the steering wheel, and a second actuator sensor for detecting a second rotation angle of an output side of the second actuator.

The failure detection device is configured to calculate at least one of a first pinion angle and a second pinion angle based on the torsion bar rotation angle and the first actuator rotation angle detected by the torsion bar sensor and the first actuator sensor, respectively, calculate a third pinion angle by adding the steering rotation angle detected by the steering sensor and the first rotation angle detected by the first actuator sensor, compare the at least one of the first pinion angle and the second pinion angle with the third pinion angle, and determine rotation sensor failure if the compared pinion angles are in disagreement.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EMBODIMENT

Figure 1:
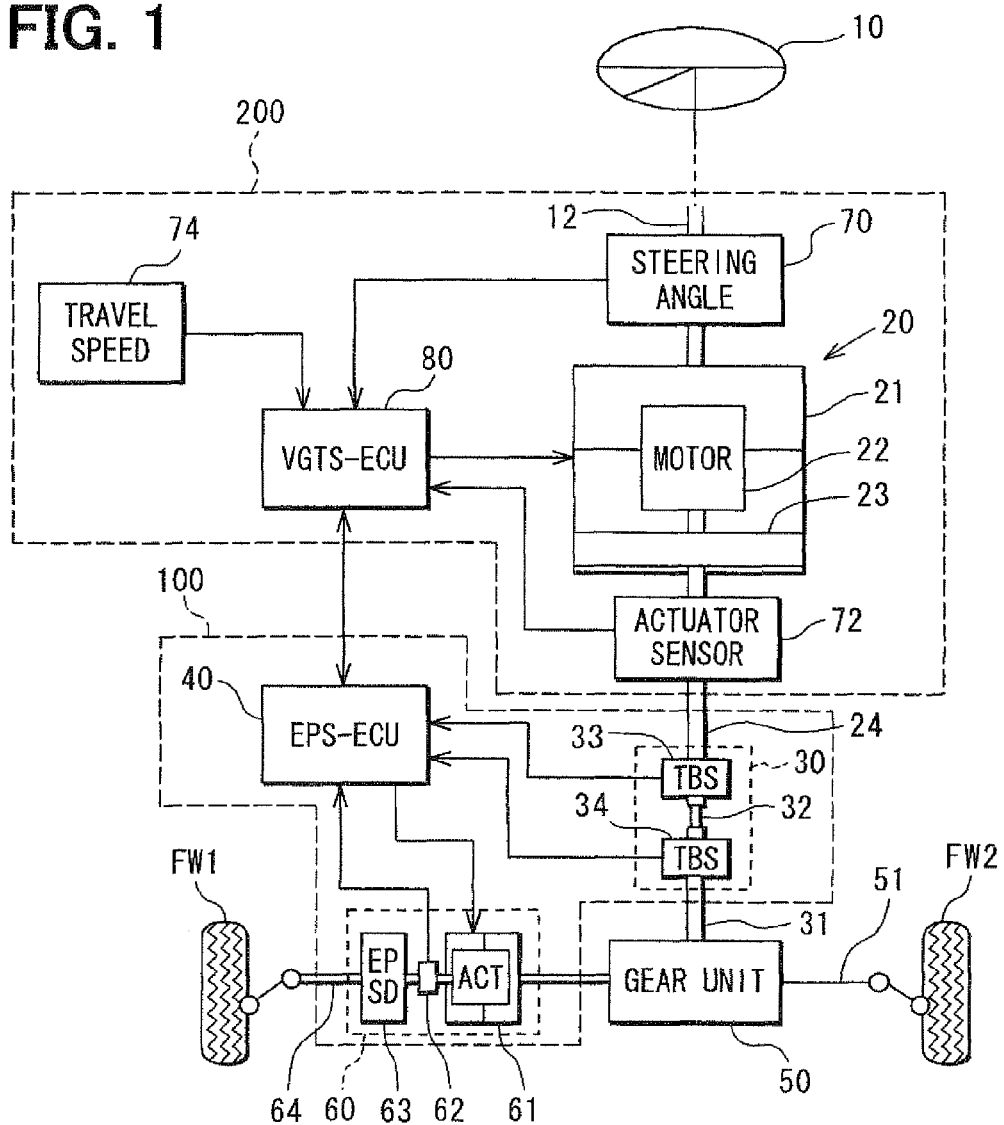
FIG. 1 is a schematic diagram showing a power steering apparatus including a steering power assisting system and a variable gear transfer system according to an embodiment of the present invention.

Referring to FIG. 1, a power steering apparatus for a vehicle according to one embodiment includes a steering wheel 10, a power assisting system 100 and a variable gear transfer system 200.

The steering wheel 10 is fixed to a steering shaft 12. An electric actuator 20 is coupled with the steering shaft 12. The second electric actuator 20 may be a conventional actuator, which includes a housing 21, an electric motor 22 and a reduction gear set 23. The housing 21 is fixed to the steering shaft 12. Thus, the steering shaft 12 is an input shaft to the second electric actuator 20, so that the housing 21 is rotated integrally with the steering shaft 12. The casing of the motor 22 is fixed to the housing 21. An output shaft of the motor 22 is coupled to an output shaft 24 of an actuator unit through a reduction gear set 23, which transfers the motor rotation to the output shaft 24 by reducing rotation of the motor 22.

A torque sensor 30 is attached to an end of the output shaft 24 and receives the output shaft 24 as a sensor input shaft. The output shaft 24 and a sensor output shaft 31 are coupled to each other by a torsion bar 32 in a conventional manner.

When the steering shaft 12 is rotated by the steering wheel 10, the rotation of the steering shaft 12 is transferred to the output shaft 24 in a predetermined transfer ratio by the second electric actuator 20 to steer tire wheels FW1 and FW2. As a result, the torsion bar 32 is caused to twist.

The torque sensor 30 is for detecting a twist angle of the torsion bar 32. It is provided with an input shaft rotation angle sensor (torsion bar sensor) 33 for detecting a rotation angle of the output shaft 24 and an output shaft rotation angle sensor (torsion bar sensor) 34 for detecting a rotation angle of the output shaft 31. The output signals of the torsion bar sensors 33 and 34 are applied to an electronic control unit 40 for an electric power steering system (EPS-ECU).

The output shaft 31 of the sensor unit is a pinion shaft, which is formed with a pinion gear (not shown) at its end to be engaged with a rack (not shown) or a rack rod 51 in a gear unit 50. The rack rod 51 moves longitudinally (left-right) relative to rotation of the pinion gear. At one longitudinal side of the rack rod 51, an electric power steering (EPS) device 60 is disposed coaxially with the rack rod 51. The rack rod 51 is coupled with the tire wheels FW1 and FW2, which are steered wheels.

The EPS device 60 includes an electric actuator 61 as a first electric actuator, a rotation angle sensor 62 as a first actuator sensor 62, a motion direction translator (converter) 63 and a rack rod 64. The first electric actuator 61 is also an electric motor. When a rotor of the first electric actuator 61 is rotated, an output shaft of the first electric actuator 61 is also rotated integrally with the rotor. This rotation is translated into longitudinal movement of the rack rod 64 by the direction translator 63. The first actuator sensor 62 detects a rotation angle of the output shaft of the first electric actuator 61 and produces an output signal corresponding to the detected angle to the EPS-ECU 40.

The EPS-ECU 40 calculates, as a twist angle of the torsion bar 32, a difference between the rotation angle of the output shaft 24 detected by the rotation angle sensor 33 and the rotation angle of the output shaft 31 detected by the torsion bar sensor 34. The EPS-ECU 40 further calculates a first target angle of the first electric actuator 61 based on the calculated twist angle and a travel speed of the vehicle, which may be detected by a travel speed sensor 74. The EPS-ECU 40 feedback-controls the rotation angle of the first electric actuator 61 and produces a command signal to the first electric actuator 61 so that the rotation angle detected by the first actuator sensor 62 agrees to the command angle indicated by the command signal. Thus, assisting power is provided for steering the vehicle.

A steering sensor 70 is provided in the steering shaft 12 to detect the rotation angle of the steering shaft 12 as a steering angle. An actuator sensor 72 is provided in the output shaft 24 of the actuator (second electric actuator) 20 to detect the rotation angle (second actuator angle) of the output shaft 24. The second actuator sensor 72 may be built within the second electric actuator 20 so that the rotation angle of the reduction gear set 23 or the motor 22 may be detected as the rotation angle of the output shaft 24. In this case, the actuator rotation angle may be calculated by multiplying the detected value of the second actuator sensor 72 by a predetermined coefficient corresponding to the reduction ratio of the reduction gear set 23.

The detected steering angle and the detected second actuator angle are applied to an electronic control unit for a variable gear transfer system (VGTS-ECU) 80. The detected travel speed is also applied to the VGTS-ECU 80. Those signals may be sent through an in-vehicle LAN. The EPS-ECU 40 and the VGTS-ECU 80 are connected via the in-vehicle LAN to communicate each other. The detected second actuator rotation angle and the detected travel speed are sent to the EPS-ECU 40 from the VGTS-ECU 80. The VGTS-ECU 80 produces a control signal to control the second electric actuator 20 based on the detected steering angle, the second actuator rotation angle and the travel speed.

Specifically, the VGTS-ECU 80 first determines a transfer ratio based on the detected travel speed by referring to mapped data table, multiplies the detected steering angle by the determined transfer ratio, and calculates the target angle of the second electric actuator 20 as the second target angle in accordance with the multiplication result and a steering speed of the steering wheel 10. For instance, the VGTS-ECU 80 feedback-controls by using the conventional P-I-D control so that a difference between the second target angle and the actual rotation angle of the second actuator 20 is zeroed.

The steering angle and the second actuator rotation angle detected by the sensors 70 and 72 are thus used in the variable gear transfer system 200 to produce the control signal. Therefore, the steering sensor 70 and the second actuator sensor 72 must be checked whether they are operating normally or in failure.

Further, the torsion bar rotation angle and the second actuator rotation angle detected by the rotation angle sensors 33, 34 and 62 are used in the power assisting system 100 to control the assisting power. Therefore, these sensors 33, 34 and 62 must also be checked whether they are operating normally or in failure.

Figure 2:
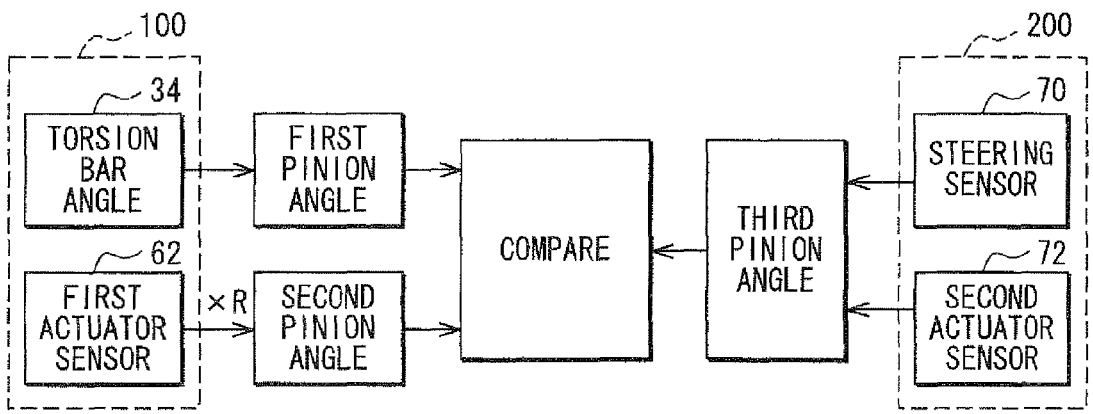
FIG. 2 is a block diagram showing failure detection performed in the embodiment.

The power steering apparatus therefore periodically executes a failure detection operation shown in FIG. 2. This operation may be performed by the EPS-ECU 40 or the VGTS-ECU 80.

Specifically, a first pinion angle is calculated based on the rotation angle detected by the torsion bar sensor 34. A second pinion angle is calculated based on the rotation angle detected by the first actuator sensor 62. A third pinion angle is calculated based on the steering angle detected by the steering sensor 70 and the actuator rotation angle detected by the second actuator sensor 72. These three pinion angles are compared one another.

Since the torsion bar sensor 34 used for calculating the first pinion angle detects the rotation angle of the output shaft 31, which is the pinion shaft, the pinion angle is determined based on the detected angle of the torsion bar sensor 34. The first actuator sensor 62 used for calculating the second pinion angle detects the rotation angle of the output shaft of the first electric actuator 61. The first electric actuator 61 and the pinion shaft 31 are coupled by way of the gear unit 50. Therefore, the second pinion angle is calculated by multiplying the detected rotation angle of the first electric actuator 61 by a fixed rack stroke ratio R of the gear unit 50.

The steering sensor 70 and the second actuator sensor 72 used for calculating the third pinion angle detect the rotation angles of the steering shaft 12 and the rotation angle of the output shaft 24 of the second electric actuator 20, which is an input shaft of the torsion bar 32. The output shaft 24 rotates with the output shaft 31 through the torsion bar 32 substantially integrally, but rotates relatively to the steering shaft 12 due to the second electric actuator 20. Therefore, the third pinion angle is calculated by adding the rotation angle of the output shaft 24 to the rotation angle of the steering shaft 12.

The three pinion angles calculated as above should agree one another, as long as the rotation angle sensors 34, 62, 70 and 72 have no failure and operate normally. If any one of these sensors has failure, the pinion angle calculated by using the detected angle of such a failing sensor does not agree with the other pinion angles calculated by using the detected angles of normally-operating sensors. Therefore, it is possible to easily detect any failure in a rotation angle sensor by comparing each calculated pinion angle with the other calculated pinion angles.

More specifically, the failure detection may be executed in the following manner.

(1) If all the pinion angles agree, all the sensors 34, 62, 70 and 72 are determined to be normal.

(2) If the second pinion angle and the third pinion angle agree with each other but not with the first pinion angle, the torsion bar sensor 34 of the torque sensor 30 is determined to be in failure.

(3) If the first pinion angle and the third pinion angle agree with each other but not with the second pinion angle, the first actuator sensor 62 is determined to be in failure.

(4) If the first pinion angle and the second pinion angle agree with each other but not with the third pinion angle, at least one of the sensors 70 and 72 is determined to be in failure.

(5) If all of the pinion angles do not agree one another, at least two of the sensors 34, 62, 70 and 72 are determined to be in failure.

As described above, according to the above embodiment, the first pinion angle and the second pinion angle are calculated by separately using the rotation angle detected by the torsion bar sensor 34 provided in the power assisting system 100 and the rotation angle detected by the first actuator sensor 62, respectively. Further, the third pinion angle is calculated by using the rotation angles detected by the steering sensor 70 and the second actuator sensor 72 of the variable gear transfer system 200. Any failure in these rotation angle sensors 34, 62, 70 and 72 is detected by comparing the calculated three pinion angles, failure detection can be performed accurately whether the failure is a mechanical one or an electrical one.

In the above embodiment, it is possible to detect failure in the rotation sensor system by using only one of the first pinion angle detected by the torsion bar sensor 34 and the second pinion angle detected by the first actuator sensor 62 and comparing the selected pinion angle with the third pinion angle calculated based on the rotation angles detected by the steering sensor 70 and the second actuator sensor 72. In this instance, it may not be possible to determine which rotation angle sensor is in failure. However, it is still possible to detect that the rotation angle sensor in either the power assisting system 100 or the variable gear transfer system 200 is in failure.

What is claimed is:

1. A power steering apparatus for a vehicle having a steering wheel to steer tire wheels, the apparatus comprising:
    a power assisting system including a torsion bar operatively coupled with the steering wheel, a first electric actuator operatively coupled with the output side of the torsion bar to provide steering assisting power to steer the tire wheels, a torsion bar sensor for detecting a rotation angle of an output side of the torsion bar, and a first actuator sensor for detecting a first rotation angle of the first actuator; and
    a variable gear transfer system including a second electric actuator provided between the steering wheel and the torsion bar for transferring rotation of the steering wheel to the torsion bar at a variable transfer ratio thereby to change an amount of steering angle of the tire wheels relative to an operation amount of the steering wheel, a steering sensor for detecting a steering rotation angle of the steering wheel, and a second actuator sensor for detecting a second rotation angle of an output side of the second actuator, characterized by further comprising:

a failure detection device configured to calculate at least one of a first pinion angle and a second pinion angle based on the torsion bar rotation angle and the first actuator rotation angle detected by the torsion bar sensor and the first actuator sensor, respectively, calculate a third pinion angle by adding the steering rotation angle detected by the steering sensor and the first rotation angle detected by the first actuator sensor, compare the at least one of the first pinion angle and the second pinion angle with the third pinion angle, and determine rotation sensor failure if the compared pinion angles are in disagreement.

2. The power steering apparatus according to claim 1, wherein the failure detection device is configured to calculate all the first pinion angle, the second pinion angle and the third pinion angle, and compares all the pinion angles one another.

3. The power steering apparatus according to claim 2, wherein the failure detection device is configured to determine that the torsion bar sensor is in failure, if the second pinion angle and the third pinion angle are in agreement with each other but the first pinion angle is in disagreement with the second pinion angle and the third pinion angle.

4. The power steering apparatus according to claim 2, wherein the failure detection device is configured to determine that the first actuator sensor is in failure, if the first pinion angle and the third pinion angle are in agreement with each other but the second pinion angle is in disagreement with the first pinion angle and the third pinion angle.

5. The power steering apparatus according to claim 2, wherein the failure detection device is configured to determine that at least one of the steering sensor and the second actuator sensor is in failure, if the first pinion angle and the second pinion angle are in agreement with each other but the third pinion angle is in disagreement with the first pinion angle and the second pinion angle.

6. The power steering apparatus according to claim 1, wherein the electronic control system of the variable gear transfer system calculates the second target rotation angle based on a travel speed of the vehicle in addition to the steering rotation angle detected by the steering sensor.

7. The power steering apparatus according to claim 1, wherein:

the power assisting system includes an electronic control unit that calculates a twist angle of the torsion bar based on a difference between the rotation angles detected by the second actuator sensor and the torsion bar sensor, calculates an assisting power which the first electric actuator is required to generate based on the calculated twist angle, calculates a first target rotation angle of the first electric actuator based on the calculated assisting power, and controls the first actuator so that the first rotation angle detected by the first actuator sensor attains the calculated first target rotation angle;

the variable gear transfer system includes an electronic control unit that calculates a second target rotation angle of the second electric actuator based on the steering rotation angle detected by the steering sensor, and controls the second electric actuator so that the second rotation angle detected by the second actuator sensor attains the calculated second target rotation angle.

8. The power steering apparatus according to claim 2, wherein the failure detection device calculates the second pinion angle by multiplying the rotation angle detected by the first actuator sensor by a predetermined ratio.

* * * * *